United States Patent [19]

Schoen et al.

[11] Patent Number: 4,564,417

[45] Date of Patent: Jan. 14, 1986

[54] METHOD OF MANUFACTURING AN OPTICAL COUPLING DEVICE

[75] Inventors: Josef Schoen; Rudolf Hoffmann, both of Munich, Fed. Rep. of Germany

[73] Assignee: Siemens Aktiengesellschaft, Berlin & Munich, Fed. Rep. of Germany

[21] Appl. No.: 538,964

[22] Filed: Oct. 4, 1983

[30] Foreign Application Priority Data

Oct. 21, 1982 [DE] Fed. Rep. of Germany ....... 3239011

[51] Int. Cl.⁴ ................ B44C 1/22; C03C 15/00; C03C 25/06

[52] U.S. Cl. ....................... 156/633; 65/31; 156/639; 156/645; 156/657; 156/663; 350/96.22

[58] Field of Search ............... 156/629, 633, 645, 655, 156/657, 663, 637, 639; 65/4.2, 4.21, 4.3, 31; 350/96.22

[56] References Cited

U.S. PATENT DOCUMENTS

| | | | |
|---|---|---|---|
| 3,874,781 | 4/1975 | Thiel | 350/96 |
| 4,265,699 | 5/1981 | Ladany | 156/663 X |
| 4,406,732 | 9/1983 | Kayoun | 156/663 X |
| 4,448,480 | 5/1984 | Witte | 350/96.15 |

OTHER PUBLICATIONS

S. K. Sheem et al., "Single-Mode Fiber-Optical Power Divider: Encapsulated Etching Technique", *Optics Letters*, vol. 4, #1, Jan. 1977, pp. 29-31.

*Primary Examiner*—William A. Powell
*Attorney, Agent, or Firm*—Hill, Van Santen, Steadman & Simpson

[57] ABSTRACT

A method of forming an optical coupling device having plug pins received in a sleeve with one of the plug pins supporting a single waveguide and the other plug pin supporting a bundle of optical waveguides, characterized by providing the waveguides, etching the waveguides to form an end zone of a thin thickness connecting by a tapering transition zone having increasing thickness to the original cladding thickness of the optical waveguides, assembling the waveguides in an optical bundle with the end zones being arranged with the smallest spacing therebetween. Preferably, each of the plug pins has a bore with a small portion adjacent the end of the pin which corresponds to the diameter of the end zones of the bundle of waveguides.

10 Claims, 4 Drawing Figures

METHOD OF MANUFACTURING AN OPTICAL COUPLING DEVICE

BACKGROUND OF THE INVENTION

The present invention is directed to a method for manufacturing an optical coupling device having a mixer element with an end face and a bundle of glass fiber optical waveguides which have a minimum of spacing therebetween and have their end faces optically connected to the end face of the mixer element.

An optical coupling device, which has a bundle of optical fibers with thin end faces in contact with an end face of a mixing element, is disclosed in U.S. Pat. No. 3,847,781. This coupling device employs a rod-shaped cylinder mixer element of transparent material having an end face on which a bundle of optical waveguides such as glass fibers contact. The optical signal emitted from one of these optical waveguides into the mixer element is reflected by a mirrored surface on the opposite end face of the mixer element and if the element has a desired selected length, will be fed into the individual optical waveguides of the bundle. With such an optical coupling device, it is desired that the individual optical waveguides of the bundle lie next to one another without any intermediate space in order to keep the coupling losses as low as possible. The cladding, which surrounds the individual light waveguides of the bundle and serves the purpose of keeping the optical signal in the optical waveguide from leaving the waveguide, must therefore at least in the region of the optical coupling device be designed to be as thin as possible.

SUMMARY OF THE INVENTION

The present invention is directed to a method for manufacturing an optical coupling device wherein the cladding consisting of quartz glass of an optical waveguide can be reduced to a very small thickness in an uncomplicated fashion and without the functional efficiency of the optical waveguide being lost.

To accomplish these tasks, the method treats conventional optical waveguides which have a cladding consisting of quartz glass of approximately 20 μm thickness by etching away the thickness of the cladding at the end of the waveguide to a range of 3 to 5 μm by immersing the end of the fiber optical waveguide into an etching solution and holding the waveguide to extend substantially at right angles to the liquid level, and then reciprocating the fiber in an up and down movement extending parallel to the axis of the waveguide while maintaining the end in the saturated solution; then subsequently joining a plurality of these individual waveguides into a bundle; and then joining the end surface of the bundle of waveguides into contact with a mixing element. Preferably, the etching solution is a saturated solution of HF:(NH$_4$)F and is maintained at an elevated temperature of approximately 45° C.

If one proceeds in this manner, one advantageously automatically obtains an optical waveguide end regions whose cladding is so thin that an arrangment of several of these waveguides into a bundle enables producing a low loss coupling device. A conical running transition zone between the end regions of each of the fibers and the remaining portion of the optical fibers which is covered with a cladding of the original thickness provides a reduction in the danger of breaking in the boundary region between the optical waveguides with the cladding of the original thickness and the optical waveguide end regions or zones with the thin cladding.

It is a further embodiment of the invention that the end regions or zones whose cladding has been reduced in its thickness are fixed in the bundle fashion by providing a metallic plug of a conventional optical plug and socket device which plug has been drilled to provide a bore having the corresponding shape of the bundle. After inserting the bundle into the bore of the plug, the end face of the bundle at the end region together with the end face of the plug are then surface-treated by grinding and polishing. Thus, a second plug having the same dimension as the first-mentioned plug is provided with a bore and has a single optical waveguide with a core diameter, which corresponds to the diameter of the bundle of waveguides, secured therein. The two plugs are then secured together with the finished end face of the bundle of waveguides in contact with the finished end face of the single optical fiber, which single optical fiber acts as a mixing element.

In this manner, the end region of the bundle of optical fibers on the one hand and the optical waveguide which is used as the mixer element on the other hand, each exhibit a corresponding diameter and are respectively gripped in plug pins of a conventional optical waveguide plug and socket arrangement. Through introduction of these plug pins in a guide sleeve from both sides, the end face of the bundle of optical waveguides can now be easily optically coupled with the end face of the optical waveguide utilized as the mixer element. The other end of the mixer element can also be fixed in the same fashion in an additional plug pin. The mixer element held at each end in a plug pin can be connected to two bundles by means of a guide sleeve matched to the exterior diameter of the plug pin. Thus, the mixer element will extend between two bundles and interconnect these.

In this manner, the mixer element can be simply inserted in an optical transmission path which consists of a section of bundles of optical waveguides. Thus, the optical signal transmitted on one side of the mixer element by each glass fiber which form the optical waveguides are combined in the mixer element and this combined signal is fed into each of the glass optical fibers on the other side of the mixer element.

DESCRIPTION OF THE PREFERRED EMBODIMENTS

Figure 4:
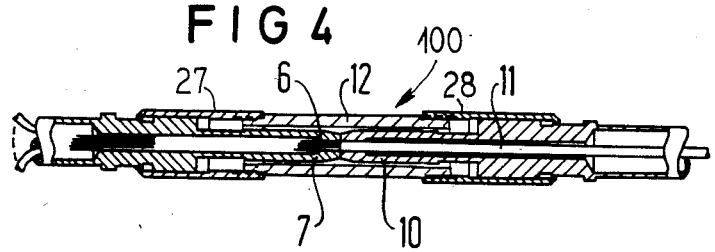
FIG. 4 is a cross-sectional view illustrating the plug pins received in a socket to form the coupling device in accordance with the present invention.

The principles of the present invention are particularly useful in forming a coupling device generally indicated at 100 in FIG. 4. The coupling 100 has a first plug pin 7 containing a plurality of optical fibers arranged in the bundle 6 and a second plug pin 10 which supports a single optical fiber 11 that acts as a mixing element. The two plug pins are aligned and held together by a sleeve 12 which has a bore that corresponds to the outside diameter of the pins 7 and 10. To hold the pins 7 and 10 in the sleeve 12, the pin 7 has a threaded sleeve 27 and the pin 10 has a similar threaded sleeve 28 that are threaded into the threaded ends of sleeve 12.

Figure 1:
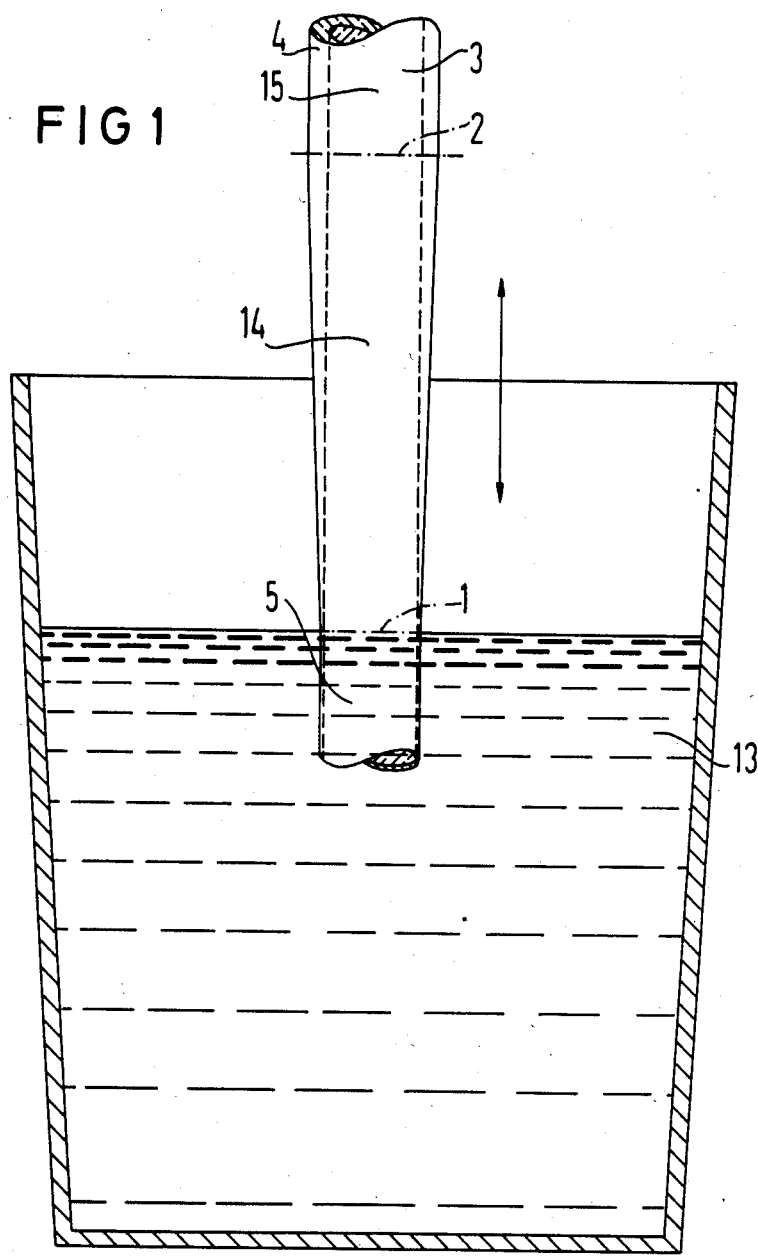
FIG. 1 is a cross-sectional view of a container containing an etching bath illustrating the method of etching the ends of the optical fibers in accordance with the present invention.

In order to form the device 100, the first step comprises providing a plurality of optical waveguides 3 which have an optical waveguide end region or zone 5 connected by a tapering portion 14 to the remaining portion 15. Each of the waveguides 3 is a commercially optical fiber having a core with a cladding 4 of quartz glass having a thickness of approximately 20 μm. In the end region 5, the cladding thickness has been reduced to approximately 3 to 5 μm. The partial range 14 extending between the end region 5 and the remaining portion or region 15 has a tapering cladding to form a tapering transition zone or section which as illustrated in FIG. 1, extends between the broken line 1 and the broken line 2. This tapering transition zone 14 reduces the danger of breakage at the junction or transition between the fiber of the normal size such as the region 15 and the reduced diameter end zone 5.

In order to obtain the transition zone and the reduced cladding thickness in the end zone 5, the optical fiber 3 has its end zone 5 and transition section 14 immersed into a bath 13 of an etching solution. The end zone 5 is continually held in the solution of the bath 13 and the fiber is reciprocated in a vertical direction indicated by the double-headed arrow so that the zone 14 is continually dipped into the solution 13 and then removed. Thus, due to the different length of time of contact, different amounts of the cladding in the region 14 will be removed to form a cladding layer which tapers from the thin layer of zone 5 to the thicker layer in the region 15. Preferably, the etching solution is at an elevated temperature of approximately 45° C. and preferably the solution is a saturated solution of $HF:(NH_4)F$ which is a conventional etching solution for quartz glass optical fibers.

Figure 2:
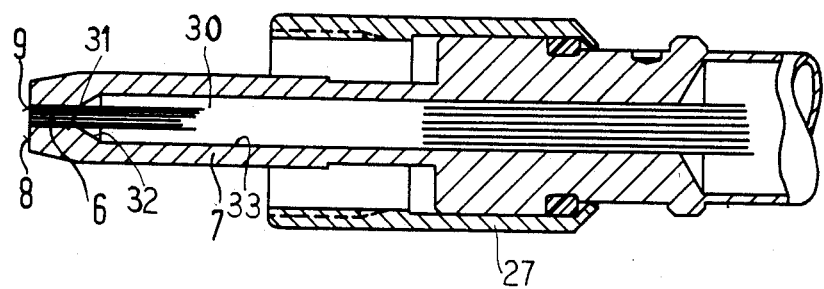
FIG. 2 is a cross-sectional view of a plug pin containing a bundle of the fibers prepared in accordance with the present invention.
Figure 3:
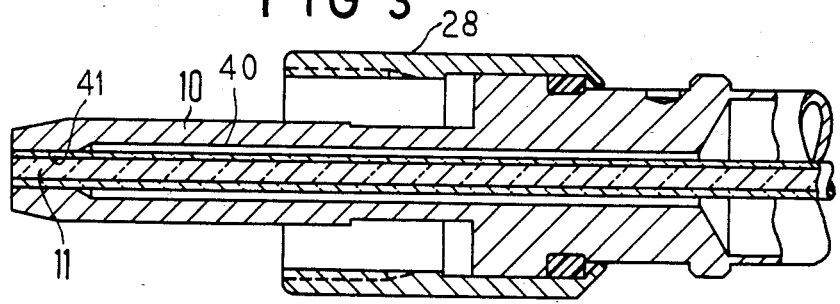
FIG. 3 is a cross-sectional view of a corresponding plug pin receiving an end of a single optical fiber acting as the mixing element.

After each of the plurality of fibers 3 has been etched to produce the end zone 5 which have a thin cladding connected by a transition zone 14 to the remaining zones 15, the desired number of optical waveguides are formed into an optical waveguide bundle 6 (FIG. 2). The bundle 6 is inserted in a correspondingly drilled-out concentric bore 30 of a plug pin 7 of the plug and socket connecting device that forms the plug or coupling device 100. The bore 30 has a small diameter portion 31 connected by a tapered portion 32 to a large diameter portion 33 with the end zone or regions 5 of the fibers being held in the small diameter portion 31. The end surfaces are ground so that the end faces 8 and 9 of the plug pin 7 as well as the end faces of the bundle 6 lie in the same finished plane. In the plug pin 7, the plurality of waveguides of the bundle 7 are closely adjacent disposed optical waveguides and are fixed and held as if they were a single optical waveguide in the pin 7. In a pin 10 (FIG. 3), which is the same configuration as the pin 7, an individual optical waveguide 11 is mounted in a small portion 41 of a concentric bore 40. The end of the fiber 11 has been finished to lie in a plane corresponding to the plane 8 and 9 of the pin 7. By utilizing a guide pin or sleeve 12 whose guide bore is matched to the exterior diameter of the plug pins 7 and 10, it is possible to couple in a simple fashion the optical waveguide bundle 6 with the individual optical waveguide 11 which acts as a mixer element. Thus, an optical signal arriving in the individual optical waveguides of bundle 6 will be coupled into the individual optical waveguide 11 which acts as the mixing element.

If, on the other hand, the other end of the optical waveguide 11 is provided with a plug pin similar to the plug pin 10 and if another bundle 6 of optical waveguides are placed in another pin 7, then the mixing element formed by the waveguide 11 can be coupled at the opposite end to another bundle for transmitting the optical signals contained therein to the other bundle. In this manner, signals coming in the bundle of fibers 6 illustrated in FIG. 4 as being coupled through the pin 7 to the waveguide 11 can be coupled into the waveguide 11, travel through the waveguide and be coupled into a second bundle (not illustrated) at the opposite end.

Although various minor modifications may be suggested by those versed in the art, it should be understood that we wish to embody within the scope of the patent granted hereon, all such modifications as reasonably and properly come within the scope of our contribution to the art.

We claim:

1. A method for manufacturing an optical coupling device comprising a large number of glass fiber optical waveguides arranged in a bundle with the ends having a very small space therebetween and the end faces of the waveguides of the bundle being held in optical contact with a mixing element, said method comprising the steps of providing a plurality of optical waveguides having a cladding of quartz glass of a given thickness; etching each of the fibers to form an end zone with a thin cladding connected by a transition zone having a cladding of increasing thickness from the thin cladding to the given thickness by holding the waveguide to extend perpendicularly to a surface of an etching solution with the end zone continually in the solution and by reciprocating the fiber along the axis to intermittently immerse the transition zone of the fiber into the solution; and assembling a plurality of the etched fiber waveguides into a bundle with the end zones adjacent each other and with a minimum spacing therebetween.

2. A method according to claim 1, wherein the step of providing the optical waveguides provides optical waveguides with a cladding of a thickness of 20 μum, said step of etching the end zone to have a cladding thickness in the range of 3 to 5 μm, said step of etching providing a saturated solution of $HF:(NH_4)F$ at a temperature of approximately 45° C.

3. A method according to claim 2, wherein said step of assembling the etched waveguides into a bundle includes providing a plug pin having a bore with a small diameter portion, inserting the bundle into said plug pin with the end zones being received in the small bore, surface grinding the end of the plug pin and the exposed ends of the end zones of the bundle to form end faces for the waveguides of the bundle with an optical quality.

4. A method according to claim 3, which further includes providing a single waveguide having a diameter approximately equal to the diameter of the bundle of etched waveguides, providing a second plug pin having a concentric bore of the shape and size of the bore of the first-mentioned pin, assembling the single optical waveguide in said second pin, optically finishing the exposed surface of the pin and waveguide.

5. A method according to claim 4, which further includes providing a guide sleeve having an internal diameter matched to the external diameter of the plug pins, said plug pins being inserted in the guide sleeve to hold the end faces of the optical waveguide bundle against the end face of the single waveguide.

6. A method according to claim 3, which further includes mounting the other end of the single optical waveguide in an additional plug pin.

7. A method according to claim 6, which includes providing a guide sleeve for each end of the single waveguide and providing a second bundle formed in a plug pin, assembling the plug pins of the single waveguide which acts as a mixing element into the guide sleeves and assembling the plug pins containing the bundles of waveguides into the sleeves so that a mixing element between two waveguide bundles is produced.

8. A method according to claim 1, wherein the step of forming the bundle comprises providing a metal plug pin having an internal bore with a small portion and a large portion connected together, inserting the assembled bundle of waveguides into said bore with the end zones being received in the small portion and having the end faces extending past the end of the pin, and then optically finishing the end of the pin and the end faces to form optical end faces for the bundle lying in the plane of the end of the pin.

9. A method according to claim 8, which includes forming a mixing element by providing additional plug pins each having a bore corresponding to the plug pin of the first-mentioned pin, inserting a single optical waveguide into the plug pins with the optical waveguide having a diameter corresponding to the small portion of the pins, finishing the ends of the optical waveguides extending past said pins to form end faces of a mixer element.

10. A method according to claim 9, which further includes providing a second bundle in a pin formed by an identical method as the first-mentioned bundle, providing a guide sleeve for each end of the mixer element, inserting the plug pins of the mixer element in the individual guide sleeves and inserting the plug pins of the bundles to form a mixer element interposed between a pair of bundles of optical waveguides.

* * * * *